United States Patent [19]
Parrish-Bhagwat

[11] Patent Number: 6,074,076
[45] Date of Patent: Jun. 13, 2000

[54] TOOTH BRUSHING TIMING DEVICE

[76] Inventor: Joyce Parrish-Bhagwat, 1811 Arcdale, Rowland Heights, Calif. 91748

[21] Appl. No.: 09/220,029

[22] Filed: Dec. 23, 1998

[51] Int. Cl.⁷ .................................................. F21V 33/00
[52] U.S. Cl. .......................... 362/253; 362/253; 362/97; 362/124; 362/122; 362/806; 362/808; 15/167.1; 15/167.2; 15/236.08; 211/65; 211/60.1; 211/119.009; 248/915; 248/110; 248/9.08
[58] Field of Search .............................. 362/253, 97, 124, 362/122, 806, 808; 15/167.1, 167.2, 236.08; 211/65, 60.1, 119.009; 248/915, 110, 9.08

[56] References Cited

U.S. PATENT DOCUMENTS

| | | | |
|---|---|---|---|
| 3,998,234 | 12/1976 | Stubbmann | 132/84 |
| 4,934,940 | 6/1990 | Savery | 434/263 |
| 5,160,194 | 11/1992 | Feldman | 362/109 |
| 5,570,325 | 10/1996 | Arpadi | 368/10 |
| 5,864,288 | 1/1999 | Hogan | 340/568 |
| 5,875,796 | 3/1999 | Silver-Isenstadt et al. | 132/311 |

*Primary Examiner*—Sandra O'Shea
*Assistant Examiner*—Bertrand Zeade
*Attorney, Agent, or Firm*—Goldstein & Canino

[57] ABSTRACT

A tooth brushing timing device including a housing having a front face and a rear face. The housing has a hollow interior. The housing has an interior face disposed inwardly of the front face within the hollow interior. The interior face has a facial representation thereon. The front face has apertures therethrough aligning with the facial representation for viewing from an exterior of the housing. A timing mechanism is disposed within the hollow interior of the housing inwardly of the interior face. The timing mechanism has a rotating rod extending outwardly through the interior face and the front face. A blocking device is in communication with the timing mechanism for selectively covering the apertures in the front face to preclude visualization of the facial representation.

8 Claims, 3 Drawing Sheets

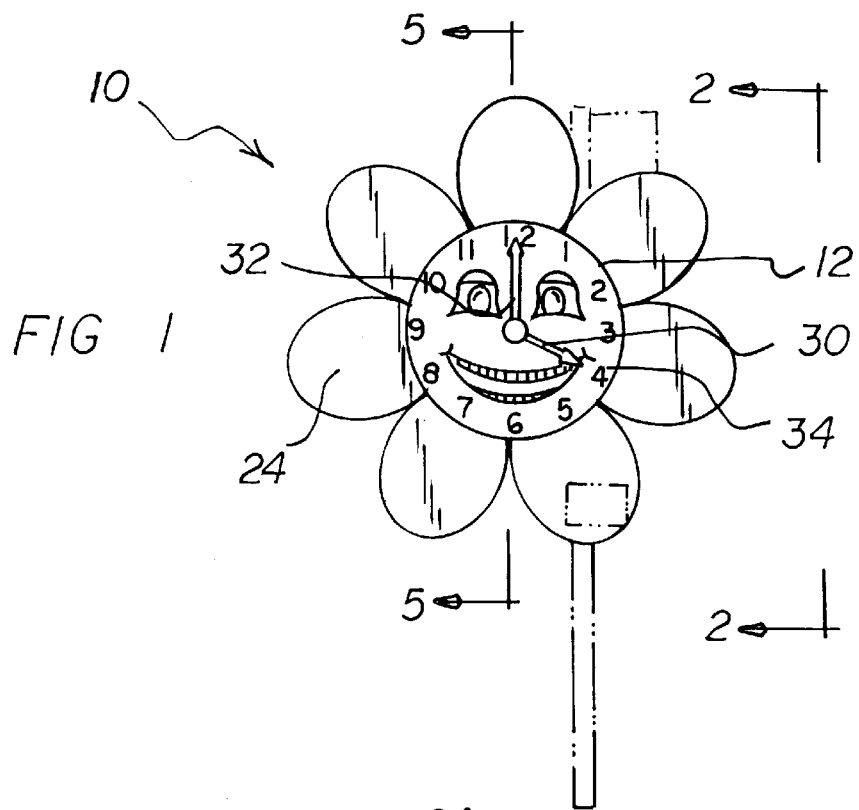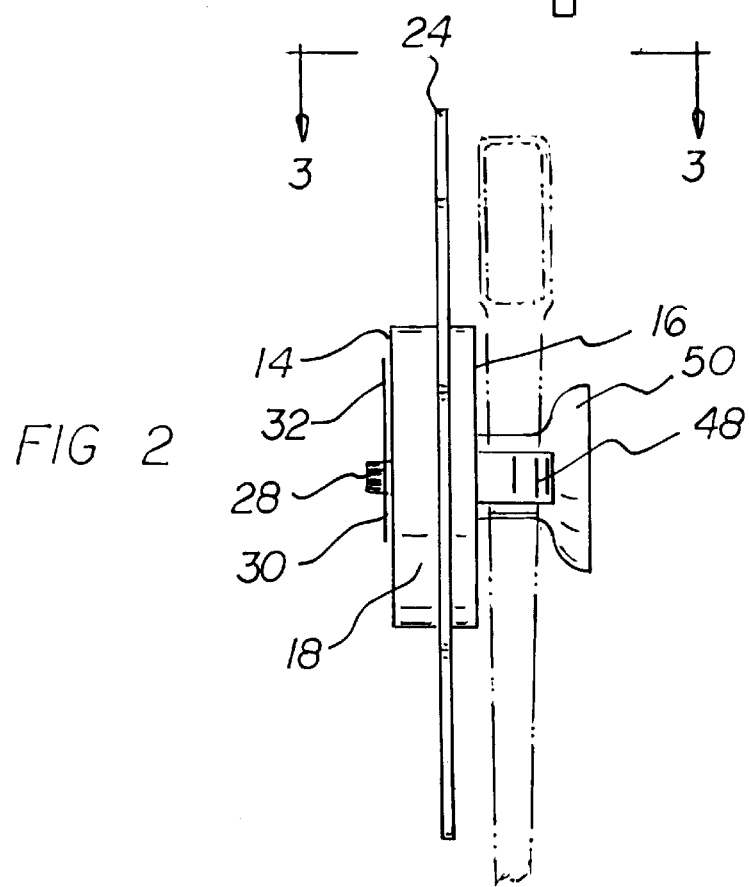

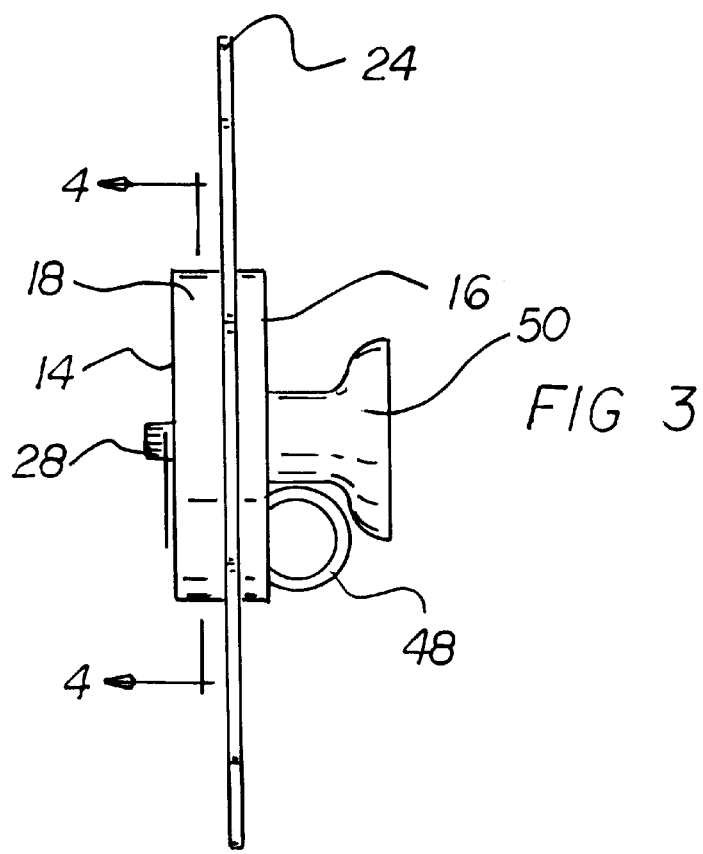
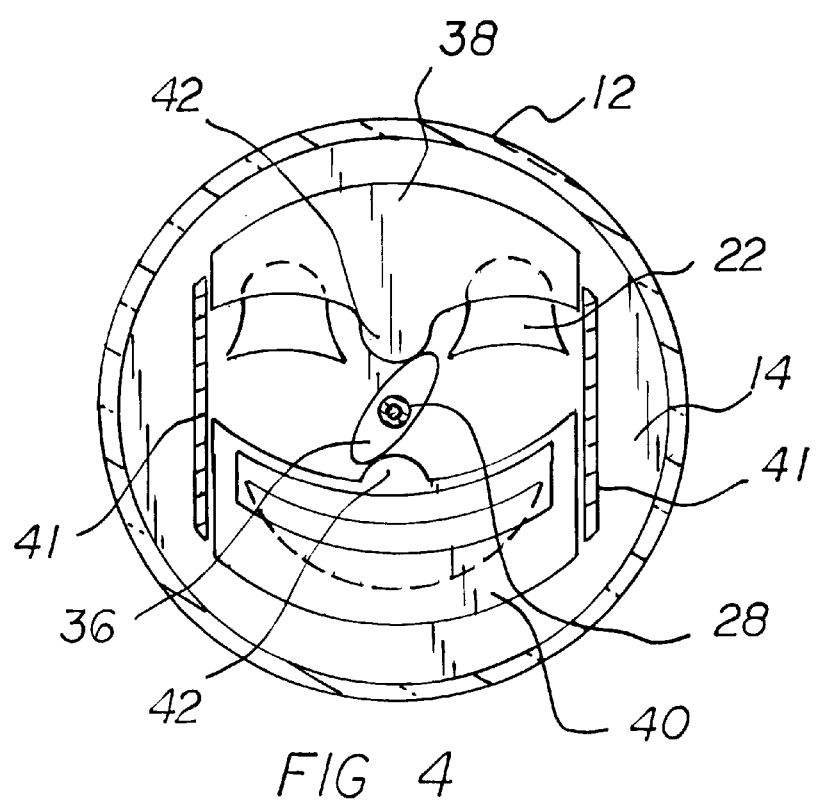

TOOTH BRUSHING TIMING DEVICE

BACKGROUND OF THE INVENTION

The present invention relates to a tooth brushing timing device and more particularly pertains to inducing children to brush their teeth.

Various displays and devices have long been utilized by parents in an effort to encourage their children to brush their teeth for an extended period of time. Dentists tell these parents that frequent tooth brushing for extended periods of time is an essential component of proper dental hygiene. There are several prior art devices which act as toothbrush holders and which provide an incentive for a small child to brush his/her teeth for a predetermined period of time. These devices are activated when the toothbrush is removed from its receptacle. These devices to not provide a clear signal that tells a small child when to start and stop brushing.

The present invention attempts to provide a device that will alert a small child to brush and to stop brushing their teeth. Additionally, the present invention can be secured to a mirror surface directly in front of the child while being used.

The use of dental hygiene device is known in the prior art. More specifically, dental hygiene device heretofore devised and utilized for the purpose of promoting dental hygiene are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,570,325 to Arpadi discloses a toothbrush holder with an amusing representation of a face and a timer incorporated therewith. The Arpadi device appears to show a housing and a visual representation of a mouth with means to show either yellow or clean teeth. U.S. Pat. No. 3,998,234 to Stubbmann discloses an animated and musical toothbrush timer. U.S. Pat. No. 4,934,940 to Savery discloses a visual display for improving dental hygiene.

While these devices fulfill their respective, particular objective and requirements, the aforementioned patents do not describe a tooth brushing timing device for inducing children to brush their teeth.

In this respect, the tooth brushing timing device according to the present invention substantially departs from the conventional concepts and designs of the prior art, and in doing so provides an apparatus primarily developed for the purpose of inducing children to brush their teeth.

Therefore, it can be appreciated that there exists a continuing need for new and improved tooth brushing timing device which can be used for inducing children to brush their teeth. In this regard, the present invention substantially fulfills this need.

SUMMARY OF THE INVENTION

In the view of the foregoing disadvantages inherent in the known types of dental hygiene device now present in the prior art, the present invention provides an improved tooth brushing timing device. As such, the general purpose of the present invention, which will be described subsequently in greater detail, is to provide a new and improved tooth brushing timing device and method which has all the advantages of the prior art and none of the disadvantages.

To attain this, the present invention essentially comprises a housing having a generally cylindrical configuration defined by a front face, a rear face, and a cylindrical side wall disposed therebetween. The housing has a hollow interior. The housing has an interior face disposed inwardly of the front face within the hollow interior. The interior face has a facial representation thereon. The front face has apertures therethrough aligning with the facial representation for viewing from an exterior of the housing. The cylindrical side wall has a plurality of radially extending decorative leaves extending outwardly therefrom. A timing mechanism is disposed within the hollow interior of the housing inwardly of the interior face. The timing mechanism has a rotating rod extending outwardly through the interior face and the front face. An outer end of the rod has an hour hand and a minute hand disposed thereon corresponding with clock numbers on the front face. A blocking device is in communication with the timing mechanism for selectively covering the apertures in the front face to preclude visualization of the facial representation. The blocking device includes a cam coupled with the rotating rod of the timing mechanism. The blocking device includes an upper shield and lower shield disposed between a pair of side brackets. The upper and lower shields are dimensioned for covering the apertures in the front face of the housing. The upper and lower shields each have an arcuate protrusion extending inwardly therefrom for selectively contacting the cam whereby a first rotation of the cam will abut the protrusions thereby pushing the shields to allow visualization of the facial representation and a second rotation of the cam will allow the shields to reset thereby covering the apertures. A light is disposed within the housing. The light is in communication with the timing mechanism. The light includes a battery to facilitate powering of the light and the timing mechanism. A toothbrush holder is secured to the rear face of the housing. The toothbrush holder is comprised of a circular ring for receiving a handle of a toothbrush therethrough whereby bristles of the toothbrush will rest atop the ring. A suction cup is secured to the rear face of the housing. The suction cup facilitates securement of the housing to a recipient surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tooth brushing timing device which has all the advantages of the prior art dental hygiene device and none of the disadvantages.

It is another object of the present invention to provide a new and improved tooth brushing timing device which may be easily and efficiently manufactured and marketed.

It is a further object of the present invention to provide a new and improved tooth brushing timing device which is of durable and reliable construction.

An even further object of the present invention is to provide a new and improved tooth brushing timing device which is susceptible of a low cost of manufacture with regard to both materials and labor, and which accordingly is then susceptible of low prices of sale to the consuming public, thereby making such a tooth brushing timing device economically available to the buying public.

Even still another object of the present invention is to provide a new and improved tooth brushing timing device for inducing children to brush their teeth.

Lastly, it is an object of the present invention to provide a new and improved tooth brushing timing device including a housing having a front face and a rear face. The housing has a hollow interior. The housing has an interior face disposed inwardly of the front face within the hollow interior. The interior face has a facial representation thereon. The front face has apertures therethrough aligning with the facial representation for viewing from an exterior of the housing. A timing mechanism is disposed within the hollow interior of the housing inwardly of the interior face. The timing mechanism has a rotating rod extending outwardly through the interior face and the front face. A blocking device is in communication with the timing mechanism for selectively covering the apertures in the front face to preclude visualization of the facial representation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the tooth brushing timing device constructed in accordance with the principles of the present invention.

FIG. 2 is a side view of the present invention as taken along line 2—2 of FIG. 1.

FIG. 3 is a plan view of the present invention as taken along line 3—3 of FIG. 2.

FIG. 4 is a cross-sectional view of the present invention as taken along line 4—4 of FIG. 3.

The same reference numerals refer to the same parts through the various figures.

DESCRIPTION OF THE PREFERRED EMBODIMENT

Figure 5:
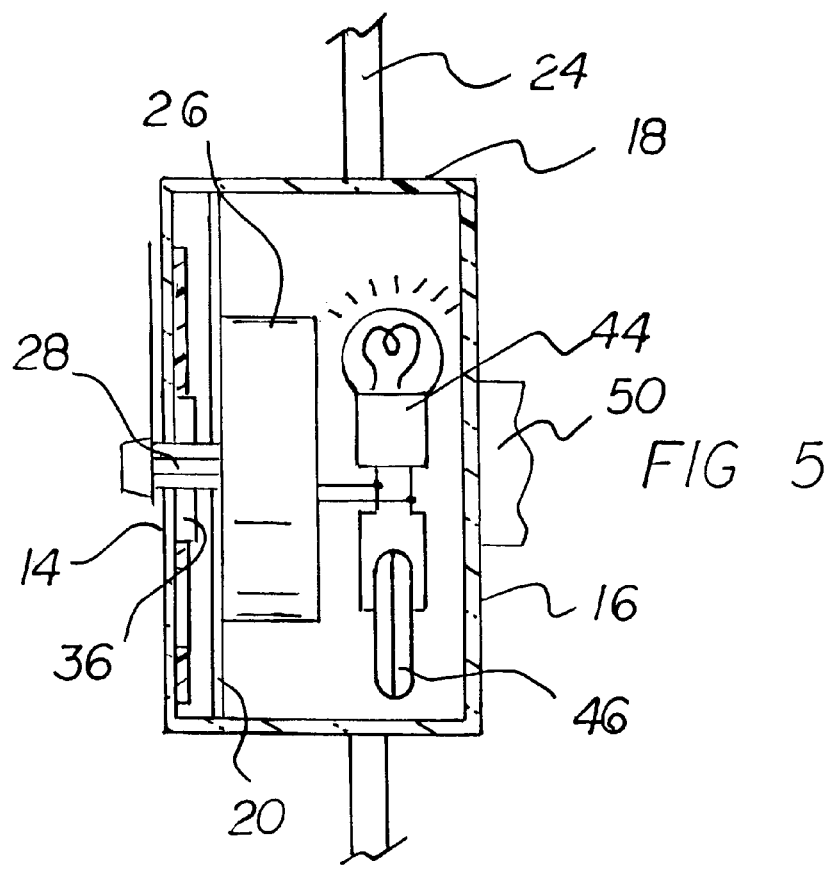
FIG. 5 is a cross-sectional view of the present invention as taken along line 5—5 of FIG. 1.

With reference now to the drawings, and in particular, to FIGS. 1 through 6 thereof, the preferred embodiment of the new and improved tooth brushing timing device embodying the principles and concepts of the present invention and generally designated by the reference number 10 will be described.

Specifically, it will be noted in the various Figures that the device relates to a tooth brushing timing device for inducing children to brush their teeth. In its broadest context, the device consists of a housing, a timing mechanism, a blocking device, a light, a toothbrush holder, and a suction cup. Such components are individually configured and correlated with respect to each other so as to attain the desired objective.

The housing 12 has a generally cylindrical configuration defined by a front face 14, a rear face 16, and a cylindrical side wall 18 disposed therebetween. The housing 12 has a hollow interior. The housing 12 has an interior face 20 disposed inwardly of the front face 14 within the hollow interior. The interior face 20 has a facial representation thereon. The front face 14 has apertures 22 therethrough aligning with the facial representation for viewing from an exterior of the housing 12. The cylindrical side wall 18 has a plurality of radially extending decorative leaves 24 extending outwardly therefrom.

The timing mechanism 26 is disposed within the hollow interior of the housing 12 inwardly of the interior face 20. The timing mechanism 26 has a rotating rod 28 extending outwardly through the interior face 20 and the front face 14. An outer end of the rod 28 has an hour hand 30 and a minute hand 32 disposed thereon corresponding with clock numbers 34 on the front face 14.

The blocking device is in communication with the timing mechanism 26 for selectively covering the apertures 22 in the front face 14 to preclude visualization of the facial representation. The blocking device includes a cam 36 coupled with the rotating rod 28 of the timing mechanism 26. The blocking device includes an upper shield 38 and lower shield 40 disposed between a pair of side brackets 41. The upper and lower shields 38,40 are dimensioned for covering the apertures 22 in the front face 14 of the housing 12. The upper and lower shields 38,40 each have an arcuate protrusion 42 extending inwardly therefrom for selectively contacting the cam 36 whereby a first rotation of the cam 36 will abut the protrusions 42 thereby pushing the shields 38,40 to allow visualization of the facial representation and a second rotation of the cam 36 will allow the shields 38,40 to reset thereby covering the apertures 22.

The light 44 is disposed within the housing 12. The light 44 is in communication with the timing mechanism 26. The light 44 includes a battery 46 to facilitate powering of the light 44 and the timing mechanism 26.

The toothbrush holder is secured to the rear face 16 of the housing 12. The toothbrush holder is comprised of a circular ring 48 for receiving a handle of a toothbrush therethrough whereby bristles of the toothbrush will rest atop the ring 48.

The suction cup 50 is secured to the rear face 16 of the housing 12. The suction cup 50 facilitates securement of the housing 12 to a recipient surface.

Figure 6:
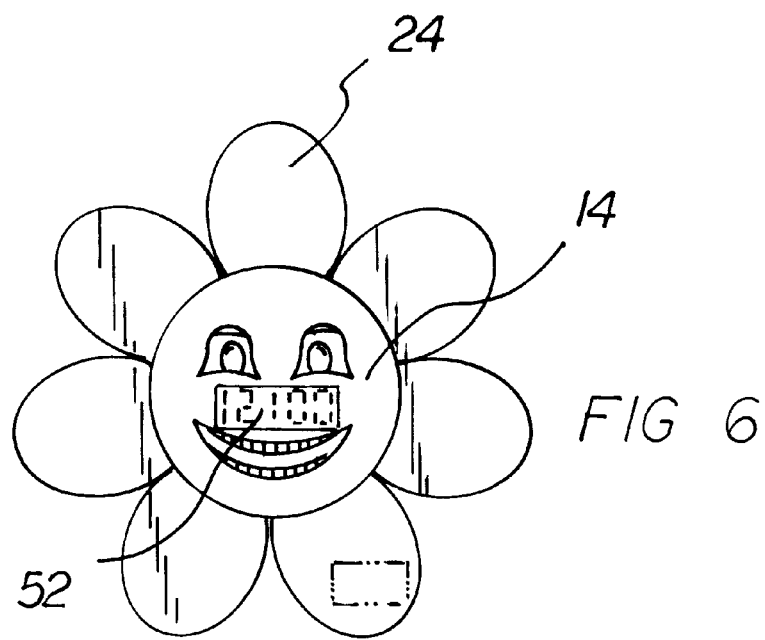
FIG. 6 is a front view of an alternate embodiment of the present invention.

A second embodiment of the present invention is shown in FIG. 6 and includes substantially all of the components of the present invention further including wherein the minute and hour hands are replaced by a digital clock 52.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A tooth brushing timing device for inducing children to brush their teeth comprising, in combination:
   a housing having a generally cylindrical configuration defined by a front face, a rear face, and a cylindrical side wall disposed therebetween, the housing having a hollow interior, the housing having an interior face disposed inwardly of the front face within the hollow interior, the interior face having a facial representation thereon, the front face having apertures therethrough aligning with the facial representation for viewing from an exterior of the housing, the cylindrical side wall having a plurality of radially extending decorative leaves extending outwardly therefrom;
   a timing mechanism disposed within the hollow interior of the housing inwardly of the interior face, the timing mechanism having a rotating rod extending outwardly through the interior face and the front face, an outer end of the rod having an hour hand and a minute hand disposed thereon corresponding with clock numbers on the front face;
   a blocking device in communication with the timing mechanism for selectively covering the apertures in the front face to preclude visualization of the facial representation, the blocking device including a cam coupled with the rotating rod of the timing mechanism, the blocking device including an upper shield and a lower shield disposed between a pair of side brackets, the upper and lower shields being dimensioned for covering the apertures in the front face of the housing, the upper and lower shields each having an arcuate protrusion extending inwardly therefrom for selectively contacting the cam whereby a first rotation of the cam will abut the protrusions thereby pushing the shields to allow visualization of the facial representation and a second rotation of the cam will allow the shields to reset thereby covering the apertures;
   a light disposed within the housing, the light being in communication with the timing mechanism, the light including a battery to facilitate powering of the light and the timing mechanism;
   a toothbrush holder secured to the rear face of the housing, the toothbrush holder being comprised of a circular ring for receiving a handle of toothbrush therethrough whereby bristles of the toothbrush will rest atop the ring;
   a suction cup secured to the rear face of the housing, the suction cup facilitating securement of the housing to a recipient surface.

2. A tooth brushing timing device for inducing children to brush their teeth comprising, in combination:
   a housing having a front face and a rear face, the housing having a hollow interior, the housing having an interior face disposed inwardly of the front face within the hollow interior, the interior face having a facial representation thereon, the front face having apertures therethrough aligning with the facial representation for viewing from an exterior of the housing;
   a timing mechanism disposed within the hollow interior of the housing inwardly of the interior face, the timing mechanism having a rotating rod extending outwardly through the interior face and the front face;
   a blocking device in communication with the timing mechanism for selectively covering the apertures in the front face to preclude visualization of the facial representation.

3. The tooth brushing timing device as set forth in claim 2 wherein an outer end of the rod has an hour hand and a minute hand disposed thereon corresponding with clock numbers on the front face.

4. The tooth brushing timing device as set forth in claim 2 wherein the blocking device includes a cam coupled with the rotating rod of the timing mechanism, the blocking device including an upper shield and a lower shield disposed between a pair of side brackets, the upper and lower shields being dimensioned for covering the apertures in the front face of the housing, the upper and lower shields each having an arcuate protrusion extending inwardly therefrom for selectively contacting the cam whereby a first rotation of the cam will abut the protrusions thereby pushing the shields to allow visualization of the facial representation and a second rotation of the cam will allow the shields to reset thereby covering the apertures.

5. The tooth brushing timing device as set forth in claim 2 and further including a light disposed within the housing, the light being in communication with the timing mechanism, the light including a battery to facilitate powering of the light and the timing mechanism.

6. The tooth brushing timing device as set forth in claim 2 and further including a toothbrush holder secured to the rear face of the housing.

7. The tooth brushing timing device as set forth in claim 6 wherein the toothbrush holder is comprised of a circular ring for receiving a handle of toothbrush therethrough whereby bristles of the toothbrush will rest atop the ring.

8. The tooth brushing timing device as set forth in claim 2 and further including a suction cup secured to the rear face of the housing, the suction cup facilitating securement of the housing to a recipient surface.

* * * * *